March 2, 1937.  C. C. MEADOWS  2,072,271
SAFETY VALVE
Filed Dec. 22, 1932
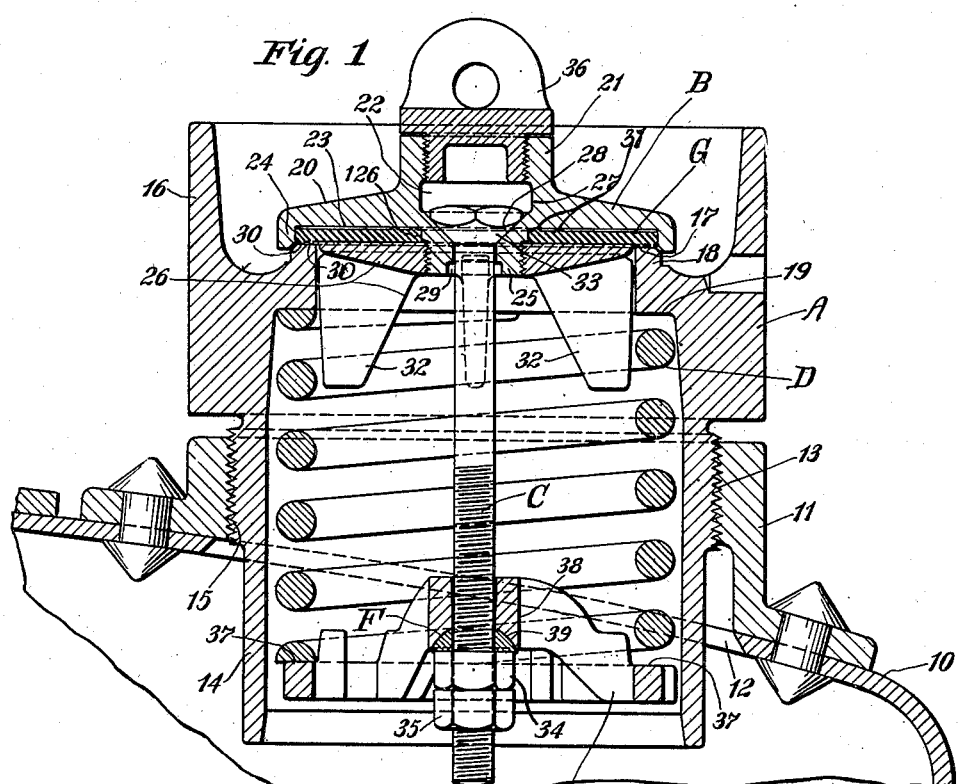
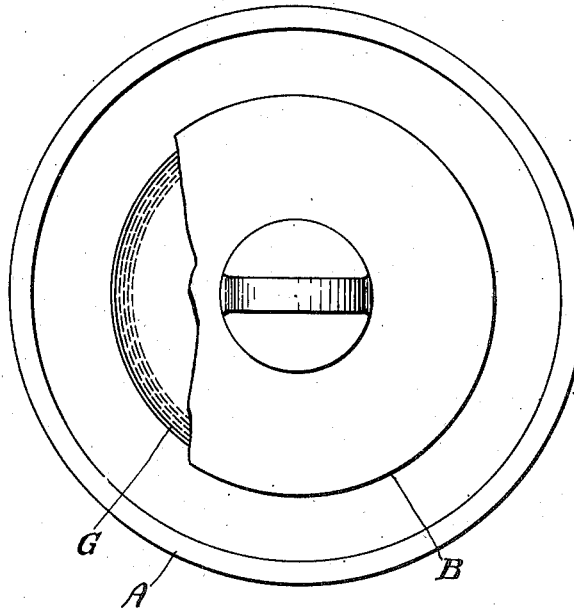
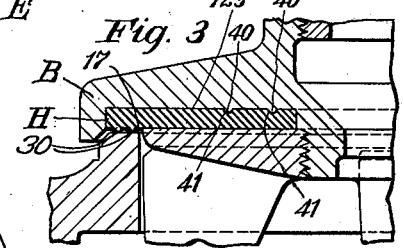
Inventor
Claude C. Meadows
By Henry Fuchs Atty.

Patented Mar. 2, 1937

2,072,271

UNITED STATES PATENT OFFICE 2,072,271

SAFETY VALVE

Claude C. Meadows, Tulsa, Okla.

Application December 22, 1932, Serial No. 648,376

1 Claim. (Cl. 137—53)

This invention relates to improvements in safety valves especially designed for use in connection with railway tank cars.

As is well known to those skilled in the railway art, it is highly important that the safety valves of tank cars should be leak-proof in order to meet the requirements of the Interstate Commerce Commission. It has been found that many safety valves now used on tank cars do not fulfill this requirement because they permit slow leakage of gasoline or other vapor. This leakage has been found to be due to improper seating of the valve, together with defects in the sealing means employed.

The main object of my invention is to overcome these defects by providing in a safety valve a valve member which automatically adjusts itself to the valve seat so as to properly seal the valve opening when the valve is closed.

Another object of the invention is to provide a spring-closed safety valve for tank cars, so designed that the pull on the valve is at all times in a straight downward direction, thereby preventing tilting of the valve with respect to its seat.

A further object of the invention is to provide, in connection with a safety valve for tank cars, a valve gasket so designed as to ensure a tight seal between the valve head and the cooperating valve seat.

Other objects of the invention will more clearly appear from the description and claim hereinafter following.

In the drawing, forming a part of this specification, Figure 1 is a vertical sectional view of a portion of the dome of the tank member of a railway tank car, illustrating my improved safety valve in connection therewith. Figure 2 is a top plan view of the safety valve shown in Figure 1. Figure 3 is a view similar to Figure 1, on an enlarged scale and partly broken away, illustrating another embodiment of the invention. And Figure 4 is a view similar to Figure 3, illustrating still another embodiment of the invention.

Referring first to the embodiment of the invention illustrated in Figures 1 and 2, 10 indicates the dome of a tank member of a tank car and 11 a flanged fitting surrounding the safety valve opening 12 of said dome. The fitting 11 is internally threaded, as indicated at 13, to receive the threaded portion of the casing of a safety valve.

My improved safety valve, as shown in Figures 1 and 2, comprises broadly a casing A; a valve head B; a valve stem C; a spring D; a spring follower E; a ball washer F, on which the spring follower E is swiveled; and a valve gasket G on the valve head B.

The casing A has a reduced lower section 14, which is externally threaded, as indicated at 15, to engage with the threads 13 of the fitting 11. The upper portion 16 of the casing A is enlarged in diameter, as clearly shown in Figure 1, and has an internal, upwardly facing, annular valve seat 17. The upper face of the seat 17 is preferably substantially flat throughout its area. The seat 17 is formed on an upwardly projecting section 18 of the casing A. Below the section 18, the casing is provided with an annular, internal abutment shoulder 19, which serves as a bearing face for the upper end of the spring D.

The valve head B comprises a main body portion 20 of substantially disclike form, having an upstanding, central, cylindrical boss 21 thereon. The boss 21 is hollow, as indicated at 22, and is internally threaded. The bottom surface of the disclike portion 20 of the valve head B is substantially flat, as indicated at 23, and is surrounded by a substantially circular, depending flange 24. The head B is also provided with a central depending projection 25, which is externally threaded to receive a clamping nut 26 for holding the gasket G in place. Immediately above the threaded section, the projection 25 is slightly enlarged in diameter, as indicated at 126. The head B is also provided with a seat or bearing opening 27 adapted to receive the head of the valve stem C. The seat 27 is located immediately below the boss portion 21 of the valve head B and has a substantially conical section 28 for a purpose hereinafter pointed out. The depending projection 25 of the valve head B is provided with a central opening 29, which communicates with the opening 27 and serves to accommodate the shank portion of the valve stem C.

The gasket G, which is fixed to the valve head B, is in the form of a flat ring, as clearly shown in Figure 1, and is seated in the ringlike opening provided therefor at the bottom of the valve head B. The ringlike opening referred to is defined by the enlarged section 126 of the projection 25 and the annular flange 24 of the main body portion of the valve head B. The gasket is formed of any resilient material which is non-corrosive and non-soluble in petroleum products. For example, the preferred gasket material is composed of a base of coal tar combined with rubber ingredients.

As clearly shown in Figure 1, the portion of the valve head which cooperates with the valve seat 17 is of substantially greater diameter than said seat and the gasket G of said valve head fully overlaps said valve seat. In the form of the invention shown in Figure 1, the gasket G is illustrated as having two depending, concentric annular beads 30—30, which engage the flat surface of the valve seat 17. The gasket G is clamped against the flat bottom face 23 of the body portion of the valve head B by means of the nut 26 screwed onto the projection 25 of said head and has two upstanding concentric beads 31—31 bearing on said face 23. The nut 26 is of well known form and has the usual depending wings 32—32.

The valve stem C has a conical head 33 at the upper end, which is seated in the tapered portion of the opening 27 of the valve head B. The stem C is threaded at its lower end to receive the pair of nuts 34 and 35. The valve stem is assembled with the head B by inserting the lower end of the stem in the opening of the upstanding boss 21 and then passing the stem through the opening 29 until the head 33 of said valve stem is seated in the conical section of the opening 27 of the valve head. The opening at the top of the valve is closed by a screw-threaded plug 36.

The spring follower E is in the form of a spider having an annular spring abutment surface portion 37 adjacent to the periphery thereof and a central hub section 38 through which the valve stem C extends. At the lower side, the hub section 38 is provided with a bearing seat 39 having a substantially concave, interior bearing surface. The spring follower E is anchored to the valve stem C by means of the nut 34 and the cooperating nut 35 which serves to lock the nut 34.

The ball-faced bearing washer F is interposed between the nut 34 and the spring follower E so as to provide for swiveling movement between the spring follower and the valve stem C. As most clearly shown in Figure 1, the washer F has a substantially spherical ball bearing surface portion, which fits the curved bearing surface of the seat 39 of the spring follower E. As will be obvious, the opening in the hub of the spring follower is of sufficient size to provide the necessary clearance for rocking movement of the spring follower with respect to the valve stem C.

The spring D, which is under initial compression, is interposed between the spring abutment 19 of the casing A and the spring follower E, and has its lower end bearing on the surface 37 of said spring follower.

In the operation of my improved safety valve, any excessive pressure will cause the valve head to be lifted off the valve seat while resisted by the tension of the spring D. When the valve is so lifted, the swiveled connection between the spring follower and the stem C ensures that the pull on the valve will be in a straight downward direction. When the pressure drops so that the valve is again seated, the swiveled connections of the valve stem with the valve head B and the follower E permit automatic adjustment of the valve head so that the gasket thereof will truly engage the flat surface of the valve seat 17. Any possible leakage is also prevented by the two annular sealing ribs 30—30 of the gasket bearing on the surface of the valve seat.

Referring next to the embodiment of the invention illustrated in Figure 3, the construction is substantially the same as that hereinbefore described in connection with Figures 1 and 2, with the exception that the valve gasket is somewhat modified and the face of the valve head on which the gasket bears is altered to correspond with the modified gasket. In Figure 3, a portion only of the valve head and cooperating valve seat of the safety valve is shown. The valve head and the cooperating valve seat shown in Figure 3 are substantially the same as the corresponding parts B and 17 hereinbefore described in connection with Figures 1 and 2 and are also respectively indicated by B and 17. The valve gasket, which is indicated by H in Figure 3, is in the form of a flat ring seated on the substantially flat bottom face 123 of the valve head B. In order to prevent leakage between the engaging surfaces of the gasket H and the valve head B, the surface 123 of the valve head is provided with two depending, concentric annular beads 40—40, which engage within annular grooves 41—41 provided on the upper side of the gasket H. The gasket H, similarly to the gasket G, is provided with two depending annular beads on the bottom side thereof, which are also indicated by 30—30 and engage the flat surface of the valve seat 17.

The operation of the safety valve illustrated in Figure 3 is substantially the same as that of the valve hereinbefore described.

Referring next to the embodiment of the invention shown in Figure 4, in which only portions of the valve head and valve seat are shown, the construction is substantially the same as that hereinbefore described in connection with Figures 1 and 2, with the exception that the valve gasket is modified and the valve seat is in the form of a relatively soft metal ring, which is secured to the valve casing. The valve casing and valve head of the form of the invention shown in Figure 4 are substantially identical with the parts A and B described in Figures 1 and 2 and are also indicated by A and B respectively. The casing has the portion which carries the valve seat provided with a substantially annular groove 42, within which is fitted a soft metal ring 43 having a flat upper surface 44, which forms the valve seating surface proper. The ring 43 is of the cross section shown in Figure 4 so as to fit the groove 42 and be held against accidental removal from the casing A. The ring 43 may be made of any suitable metal which is not corroded by the action of gasoline vapor, and either a lead or Babbitt-metal ring is preferably employed.

The valve gasket, which is in the form of a flat ring, is indicated by K and is seated on the valve head B in a manner similar to that of the gasket G described in connection with Figures 1 and 2. In order to ensure a tight seal between the gasket K and the bottom face of the valve head B, the gasket K is provided with two concentric upstanding ribs 45—45, which directly engage the bottom face of the valve head B. The gasket K is also provided with a depending annular rib 46 adjacent to the periphery thereof, which bears on the top surface of the metal ring 43, which forms the valve seat.

The operation of the safety valve shown in Figure 4 is identical with the operation of the valve described in connection with Figures 1 and 2.

I have herein shown and described what I now consider the preferred manner of carrying out my invention, but the same is merely illustrative and I contemplate all changes and modifications that come within the scope of the claim appended hereto.

I claim:

In a safety valve, the combination with a valve casing provided with a valve opening; of a ringlike upstanding flange surrounding said valve opening, said flange having a flat upper surface forming a valve seat member, said casing also having an interior spring abutment shoulder; a valve head having a depending annular flange, said flange being of greater external diameter than said upstanding flange of the casing; a central depending boss on said valve head, said boss being threaded and having a central opening therethrough; a ringlike gasket seated on said valve head between said boss and said depending flange, said gasket having a flat bottom surface inset with respect to the lower edge of said depending flange; a clamping ring threaded on said boss, and in clamping engagement with said gasket, said ring having the periphery thereof spaced from the inner edge of the depending flange of the head and also spaced from the upstanding flange of the casing, the portion of said gasket between said ring and said depending flange being normally seated on said flat valve seat; a valve stem swiveled at its upper end to said head; a bearing ring anchored to the lower end of said stem; a spring follower swiveled on said bearing ring; and a spring interposed between the spring follower and the abutment shoulder of said casing.

CLAUDE C. MEADOWS.